(12) United States Patent
Doganata et al.

(10) Patent No.: US 6,282,278 B1
(45) Date of Patent: Aug. 28, 2001

(54) UNIVERSAL CONFERENCE CONTROL MANAGER

(75) Inventors: Yurdaer Nezihi Doganata, Chestnut Ridge; Asser Nasreldin Tantawi, Somers, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/065,847

(22) Filed: Apr. 22, 1998

(51) Int. Cl.[7] .............................. H04M 3/42; H04M 3/00
(52) U.S. Cl. ............................ 379/202; 379/272
(58) Field of Search ........................ 379/202, 272

(56) References Cited

U.S. PATENT DOCUMENTS

| | | | |
|---|---|---|---|
| 5,544,237 | * | 8/1996 | Bales et al. ........................ 379/205 |
| 5,619,555 | * | 4/1997 | Fenton et al. ........................ 379/67 |
| 5,758,281 | * | 5/1998 | Emery et al. ........................ 455/428 |
| 5,916,302 | * | 6/1999 | Dunn et al. ........................ 709/204 |
| 5,995,608 | * | 11/1999 | Detampel, Jr. et al. ............. 379/205 |

* cited by examiner

Primary Examiner—Ahmad Matar
Assistant Examiner—Hector Agdeppa
(74) Attorney, Agent, or Firm—Douglas W. Cameron; Anne Vachon Dougherty (57) ABSTRACT

A method and apparatus for automatically establishing an audio conference call where one of a number of audio conference call service providers must be selected. With this invention a resource broker receives requests from a number of users desiring to establish an audio conference call. Profile data on a number of conference call service providers is maintained by the resource broker. Based on the profile data and the requests from the users, one of the audio conference call service providers is selected, and the selected audio conference service provider then establishes an audio conference call in accordance with the request from the users.

18 Claims, 7 Drawing Sheets

UNIVERSAL CONFERENCE CONTROL MANAGER

TECHNICAL FIELD

This invention relates to a method and apparatus for automatically establishing an audio conference call using one of a number of conference call service providers.

DESCRIPTION OF THE PRIOR ART

The audio conferencing services are very important part of today's business world. People who are separated by distance are brought together for meetings by these services. The cost of using an audio conference is much less than the cost of bringing people together in one room. People save time and money by participating in meetings from their homes and offices.

There are many commercial conferencing services available in the market. Most of these services are traditionally operated assisted. In other words, the participants dial in the conferencing center and talked to an operator. The primary function of the operator is to verify that the participant is authorized to join in by checking his/her password. After the verifications, the operator connects the line of the incoming call to the audio bridge. The recent technological developments in the area of computer telephony made it possible to automate conference setup and join processes. The participant may now dial the conferencing centers and punch in their pass words or account information from their phones and join to the conference without requiring operator intervention. AT&T, MCI, Sprint, ATS are some of the companies that have automated audio conference services.

With the increasing popularity of World Wide Web (WWW), some audio conference service provider accept requests to start up conferences from a Web browser. MCI, Sprint have Web sites for audio conference services. The audio bridges of these services providers are c connected to the internet and participants can invoke conference applications from their Web browsers. The status of each call can also be displayed on the browser page.

In all these services, automated or operator assisted, the participants have to chose a service provider. As a result of this, when he conference is established the participants audio signals are mixed in one single audio bridge regardless of their location. As an example, if the audio bridge is in Colorado, all the participants are connected to the bridge physically located in Colorado. This may increase the cost of the service, because of the disperse locations of the conference participants. If most participants are in New York area for example, a service provider in that area may serve better. Moreover, the participants are limited by the capacity of the bridge that they are connected to. In short, there exist no resource broker system for optimal selection of a conferencing platform.

SUMMARY OF THE INVENTION

With the help of internet technologies, a multitude of audio conference platforms can be connected to and controlled form a single point. The internet technologies make it possible to interconnect all the computers, including the computers running audio bridge control software. If all these conferencing platforms are interconnected and controlled from a single point, then available resources may be utilized more effectively. This is similar to a resource broker system tailored for audio conference resources. This audio conference resource broker system gathers, stores and processes the information about the audio conference resources such as, capacity and availability, the locations and preferences of the service requesters or users, and the locations of the audio conference service providers. This information is then used to make an optimal selection of a conference service provider.

The users of this system register their preferences and requests to this Resource Broker system over a data connection, such as internet by using their Web browsers. The Audio Service Providers, on the other hand, register their availability, pricing policies, capabilities, etc. to the same Resource Broker System by using a similar networking connection. The Resource Broker System, then finds the best possible means of connecting the users when the time comes for audio conferencing.

DESCRIPTION OF THE PREFERRED EMBODIMENT

Figure 1:
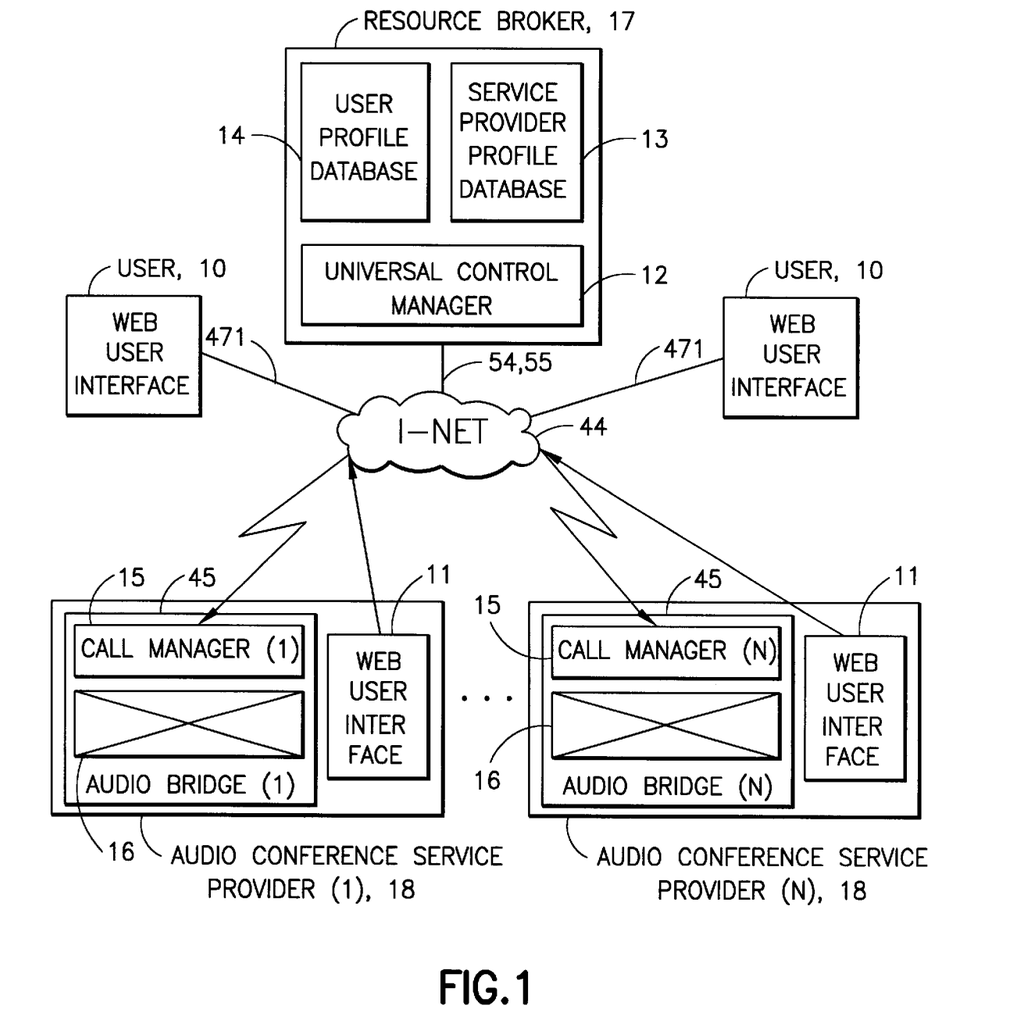
FIG. 1 schematically illustrates the resource broker of the invention and the environment in which it operates.

FIG. 1 illustrates a high level view of the system. Through a connectivity data network 2, such as the internet or an internet, a multitude of audio conferencing service platforms 18 are utilized and managed by a common resource broker 17. Furthermore, users of the system as well as audio conference service providers access and use the system by interacting with the resource broker through the connectivity data network via client interface software such as a Web browser user interface 10.

A provider of audio conference services makes a platform 18 available to the resource broker 17. The platform 18 consists of an audio bridge component 16, call manager software 15 and a WEB user interface 11. The audio bridge could be based on an open programmable switch, a PBX, a CTI (Computer Telephony Integration) system, or other technologies performing bridging and conferencing functions. Different service providers may use different technologies, thus yielding a heterogeneous system Each audio bridge is managed by a software entity, referred to as a call manager 15. The call manager interacts with the audio bridge 16 through a set of telephony application commands. Since audio bridges may have different interface specifications, call managers are tailored to the specific audio bridge that they control. A homogeneous interface, however, has to be present to the layer above the call managers, i.e. the software component that is interacting with the various call managers needs to be independent of the audio bridging technology used. Thus, a homogeneous interface (TCP/IP network interface to the various call managers needs to be present. The combination of the call manager 15 and audio bridge is referred to as a conference service center 45. See FIG. 4.

Service providers make information about their respective audio conference platforms available to the resource broker 17 via a Web user interface 11. An example template of such information is provided in FIG. 2. Provided are service provider identification information 20 audio bridge availability 21, audio bridge capacity 22, and pricing information 23.

Figure 2:
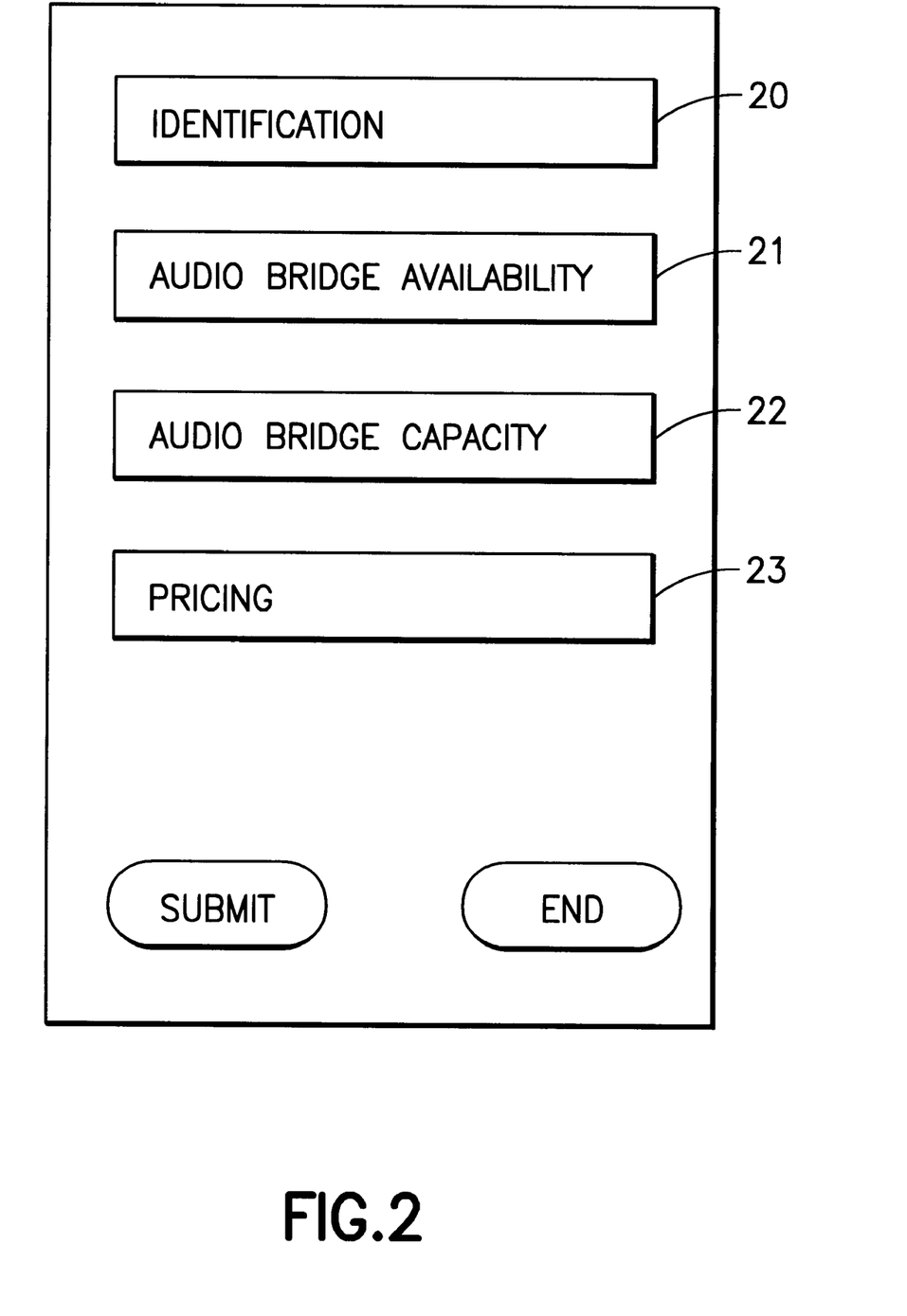
FIG. 2 schematically illustrates a template of information that is provided to the resource broker from the individual audio conference service providers.
Figure 3:
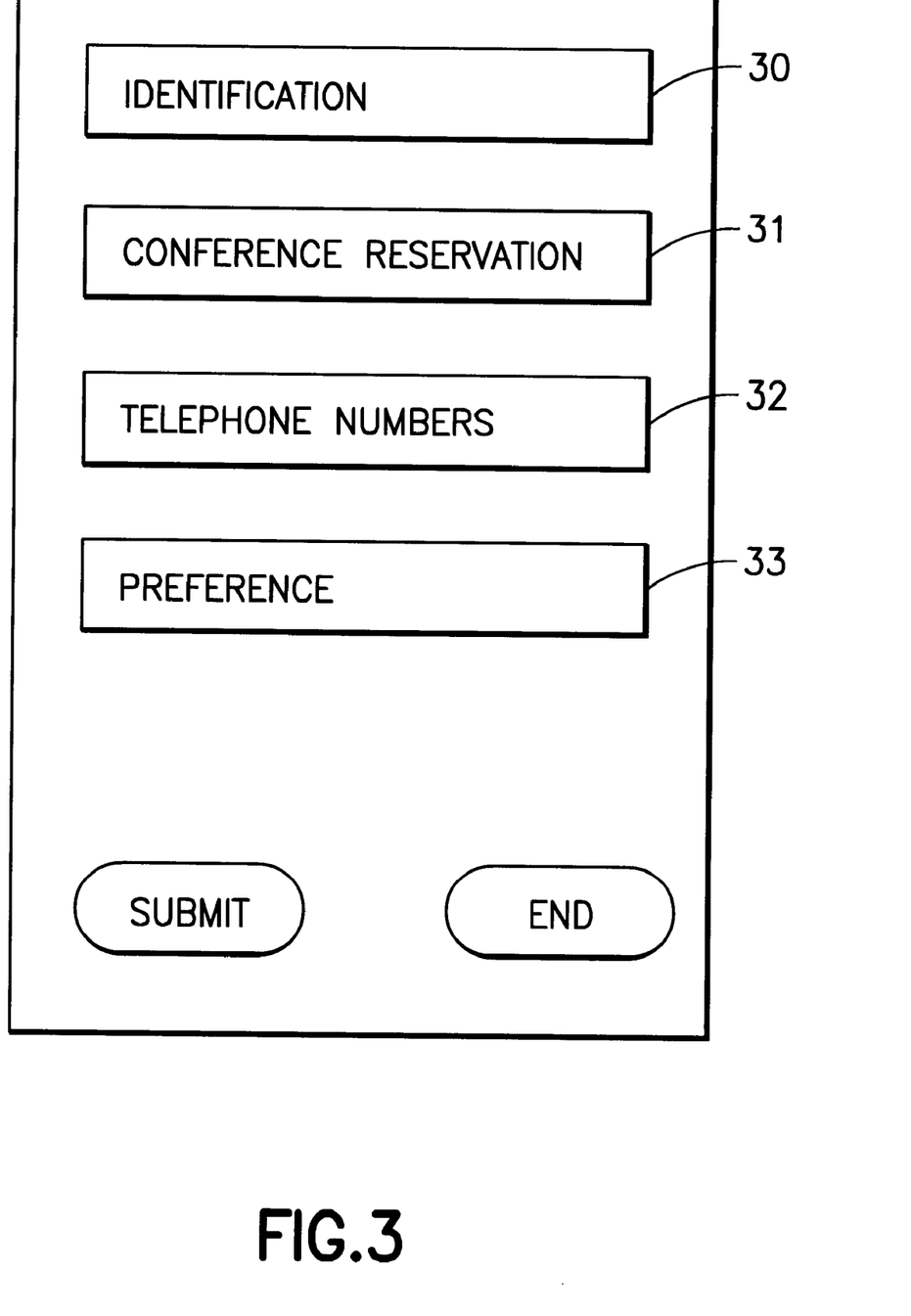
FIG. 3 schematically illustrates a sample template of information that is provided by users seeking to establish an audio conference call.

The resource broker balances the load on the available audio conference platforms based on certain criteria. Such a criteria might take number of factors into consideration such as current and projected bridge availability, tariff structure, fairness to users and service providers, service location with respect to users, audio bridge features and capacity, and telephony connectivity technology. At the heart of the resource broker is a universal control manager 12 which implements the load balancing criterion. The universal control manager interacts with the multitude of call managers in the system and consults two database systems: a service provider profile database 13 and a user profile database 14. The service provider profile database contains information about the various providers or conferencing services, such as name, location of service, billing, and attributes of platform. Information as shown in FIG. 2 is collected from user interface 11. The user profile database contains information about users of the conferencing services, such as name, access, and accounting. Such information is collected from the user interface as shown in FIG. 3.

Users access the system through a Web user interface 10. An example template of such information is provided in FIG. 3. Provided are user identification information 30, audio conference reservation 31, telephone numbers of conferees 32, and user preferences 33.

Figure 4:
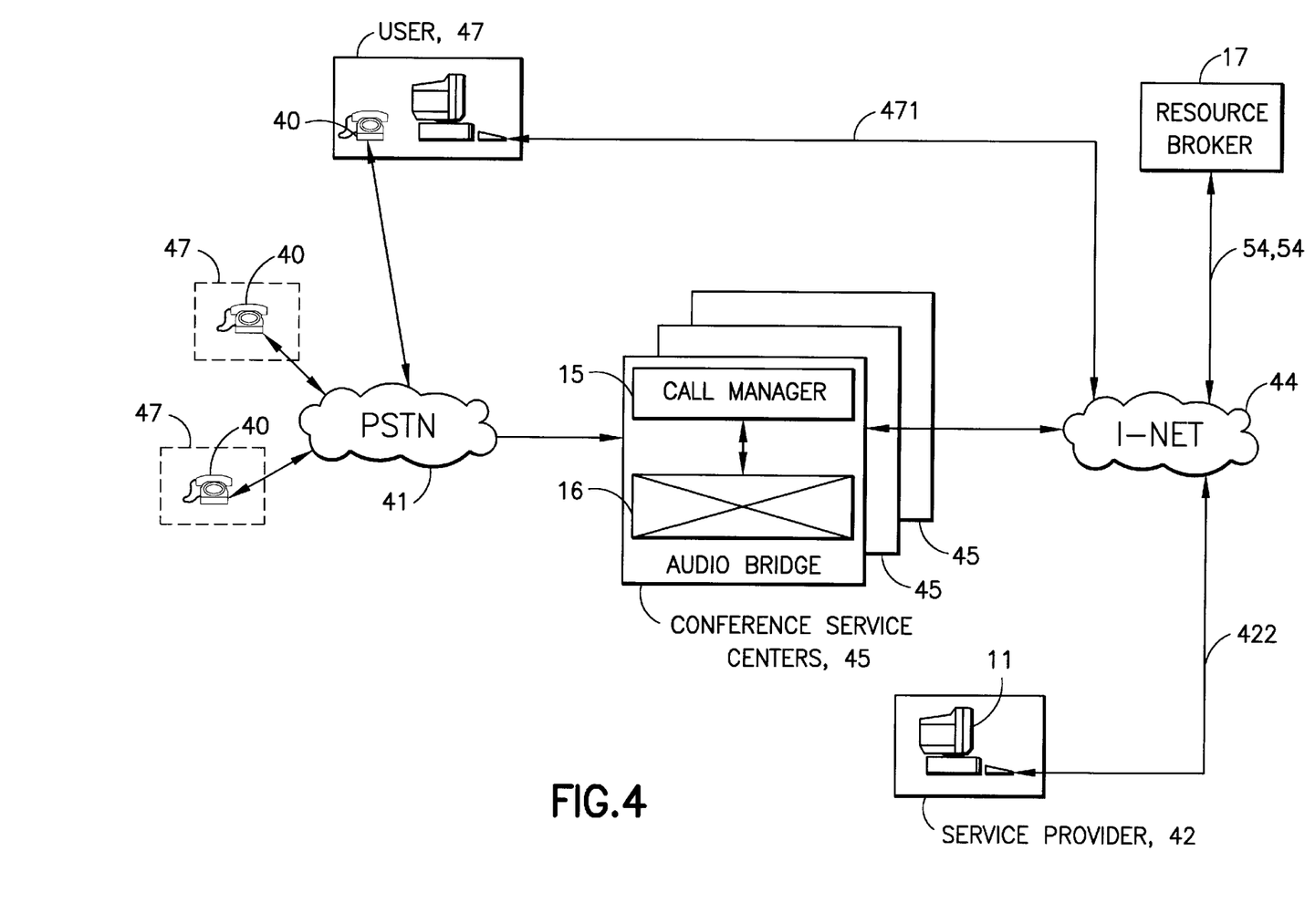
FIG. 4 schematically illustrates the environment in which the invention is implemented.

FIG. 4 shows the connectivity of users 47, audio conference service providers 42, conference service centers 45 and resource brokers 17. A service provider 42 is the owner of one or more conference service centers 45 which comprises an audio bridge 16 and call manager software 15. The service provider 42 registers its resources with the Resource Broker 17 from a computer terminal via internet connection 422. The users 47 also enter their requests for audio conference service from their computer terminals and transmit these requests to the Resource Broker via internet connections. When the time for audio conference comes, the Resource Broker sends a request for a conference to the Call Manager 15 of the selected Conference Service Center 45. The selection criteria is based on the user preferences 33, audio bridge availability 21, audio bridge capacity 22 and the price of the service 23. For instance, the user may send a request to set up a conference among 10 participants every Tuesday afternoon for an hour. The user may prefer a particular audio conference service provider or may request the service from a provider whose price is the lowest. The Resource broker 17 selects the service provider that is most suitable to users request. Once the Call Manager 15 of the service provider is invoked, the parties 40 that will participate in this audio conference are either called out or they call in the audio conference bridge to participate to the conference.

Figure 5:
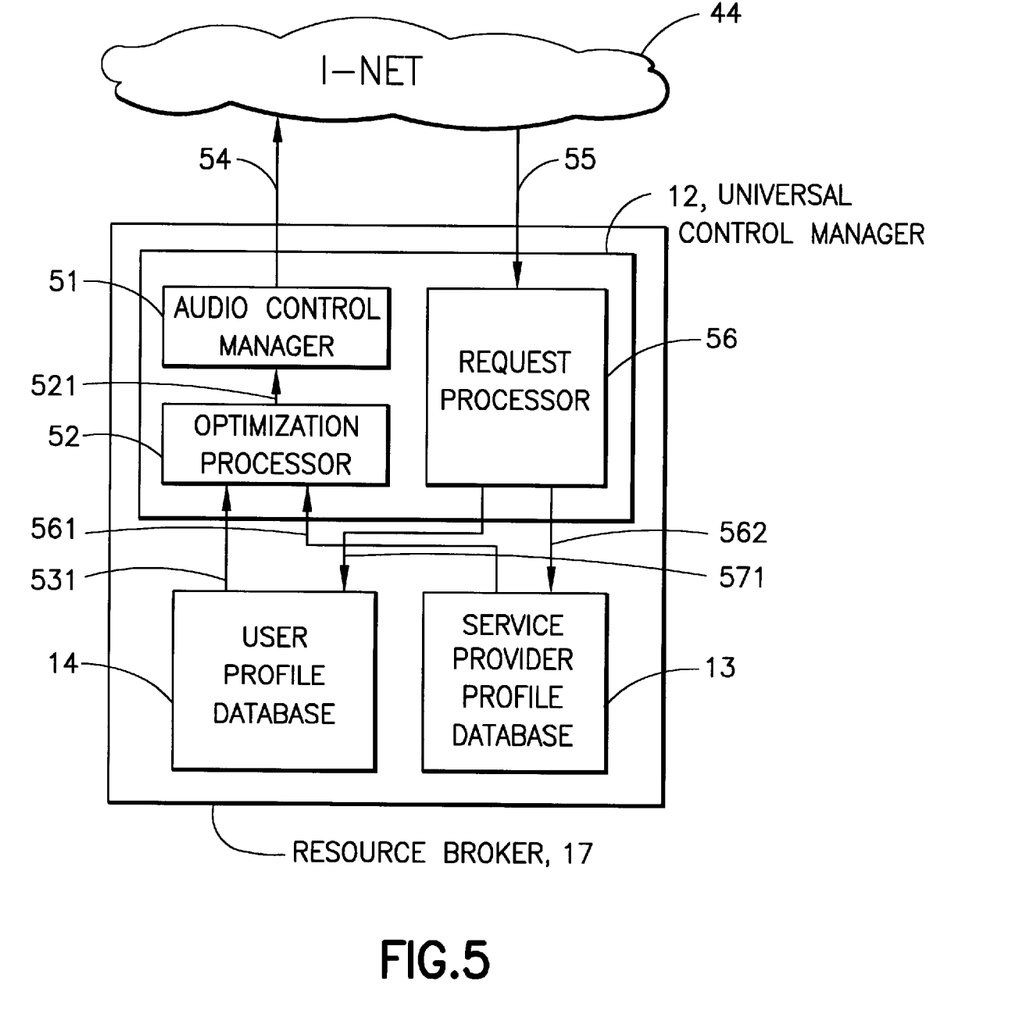
FIG. 5 schematically illustrates the resource broker in accordance with the invention.

The connection of a Resource Broker to the internet and its components are shown in FIG. 5. The Resource Broker 17 comprises a Universal Control Manager 12, A user Profile Database 14, and Service Provider Profile Database 13. Moreover, the Universal Control Manager comprises Audio Control Manager 51, Optimization Processor 52 and a Request Processor 56. All the service requests that come from users and the registration requests that come from service providers are received and processed by the Request Processor 56. The main function of a request processor is to receive and register the information into either Service Provider Profile Database or the User Profile Database. The service requests (FIG. 3) that come from users are registered into User Profile Database 14, and the resource registration information (FIG. 2) that comes from the service providers is registered into the Service Provider Profile Database 13. The Request Processor can be implemented as a multi-threaded process on the server machine that runs the Resource Broker. One thread is dedicated to listen to the internet for incoming requests 55 as a TCP/IP socket. Incoming requests are then identified according to their types and passed to either the User Profile or the Service Provider Profile Database.

Figure 7:
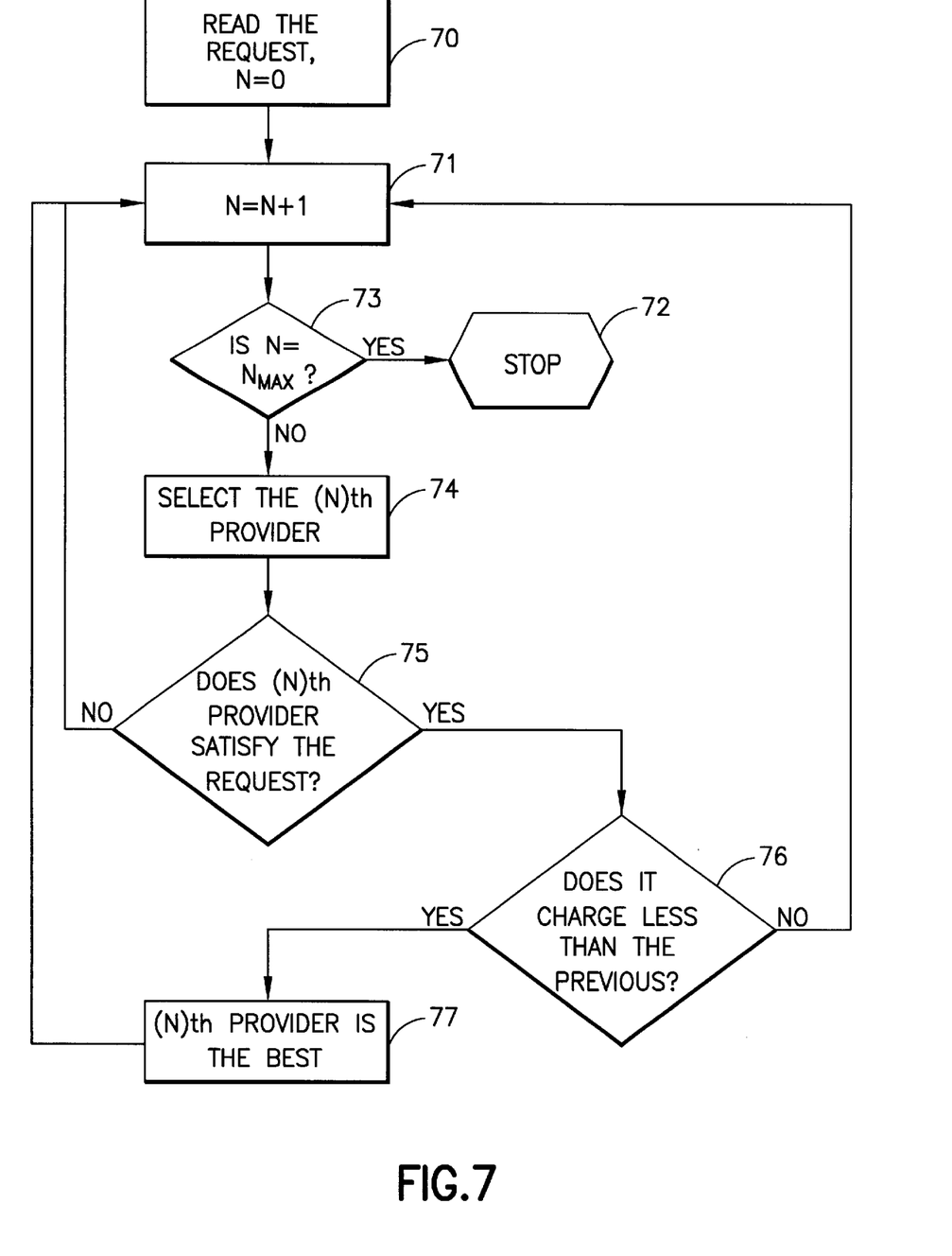
FIG. 7 provides a representative process flow for operation of the optimization process.

Optimization Processor 52 reads in the service requests from (531) the User Profile Database 14 and from (571) the Service Provider Profile Database. For every request, the Optimization Processor finds the best match among possibly more than one service providers. This can be implemented as follows. The service request for a conference contains information about the time, the number and possibly the locations of the conference participants as described in FIG. 3. First, all the service providers that are capable of satisfying this service request are identified based on their capacity and availability. Then, the pricing information is obtained from the Service Provider Profile Database 13. If the user's preference is based on the price, the service provider who charges less for the service is selected. FIG. 7 shows how the optimization processor 52 works. When a request is read 70 from the User Profile Data Base 14, the counter is set 71 and checked if there is any service provider available 73. For every service provider 74, it is checked if the request can be satisfied with the services of that provider 75. If the request is satisfied then it is checked if the service provider makes a better offer than the previous one 76. A provider is selected as the prospective candidate if it makes a better offer 77 than the previous ones. This iteration continues until all the service providers are compared.

Once the match is found the request to start or reserve a conference is sent (521) to the Audio Control Manager 51. The request contains information about the number, duration, date and time of the conference, the list of the participants and their telephone numbers, and the identification of the service provider.

Audio Control Manager 51 has means to connect (54) to the Call Managers 15 (FIG. 1) of Conference Service Centers over the internet 44. The network addresses of service providers are known to the Audio Control Manager. As soon as the request message (521) is received from the optimization processor 52, the Audio Control Manager establishes a network connection with the Call Manager of the selected service provider and sends a request to setup a conference. For every request, the Audio Control Manager establishes a network connection and exchanges data and commands with the Call Manager. Hence, the Audio Control Manager maintains as many connections with the Service Providers as the number of conferences. The conferencing commands, such as starting, closing, adding or dropping parties are sent from the Audio Control Manager to the Service Providers. The service providers, on the other hand, send back acknowledgments to these requests. The Audio Control Manager maintains a connection configuration for every conference service provider. This connection configuration can be implemented as a configuration file which contains all the connection information such as the IP addresses of the service providers, the port numbers, and the audio bridging platform that is used. The Audio Control Manager maintains multiple connectivity options and for every request it establishes a connection based on the connectivity profile of the conference service provider.

Figure 6:
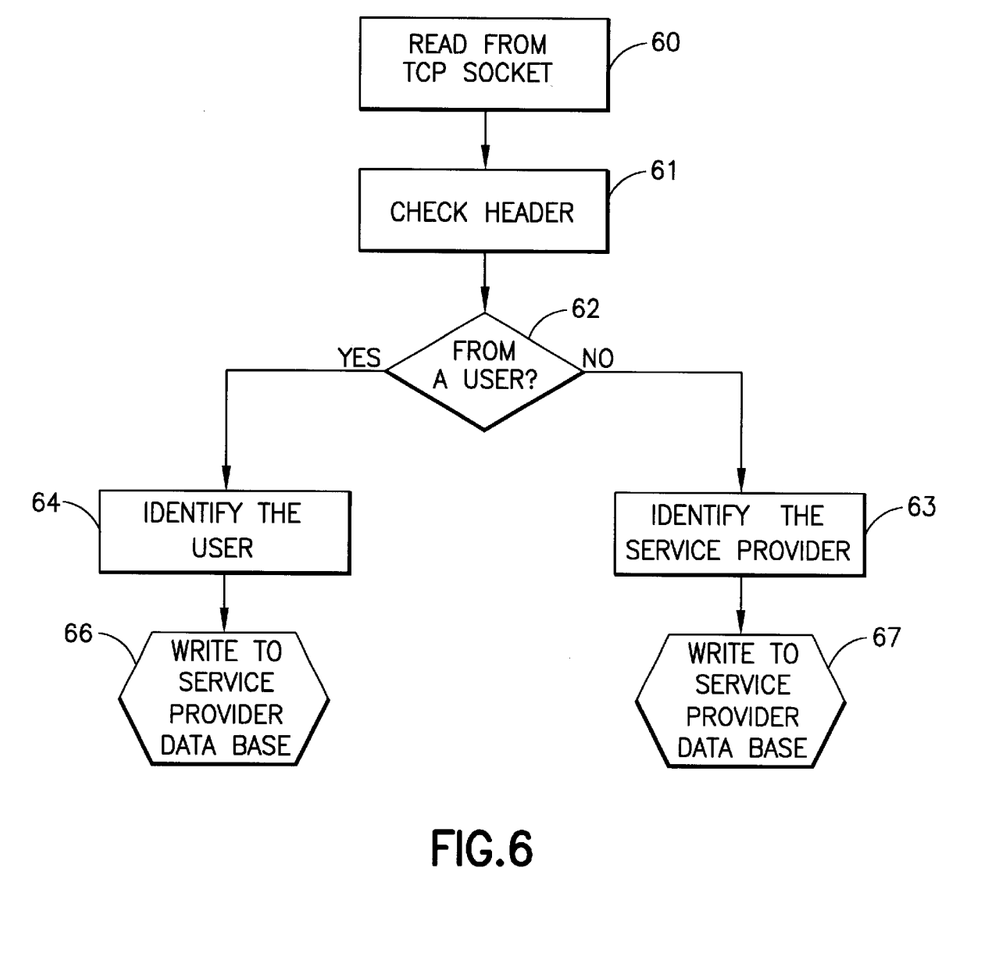
FIG. 6 schematically illustrates the operation of the request processor.

FIG. 6 shows how the request processor 56 is implemented. The incoming request from internet are read by a TCP socket 60 and their header information is checked 61. The header information shows whether the request is coming from a user or a service provider 62. Once the originator of the request is identified 63–64, the information regarding the request is registered into the appropriate database 66–67.

Having thus described our invention, what we claim as new and desire to secure by Letters Patent is:

1. In a communications network having a plurality of conference calls service providers and users connectible to each other, an audio conference resource broker independent of said service providers for automatically selecting one of a plurality of conference call service providers for establishing an audio conference call among a plurality of requesting ones of said users, said audio conference resource broker comprising:
   a. a request processor for receiving user-generated requests from said requesting users to participate in an audio conference call, said requests comprising user preference information;
   b. a service provider data base for storing profile data on each of said conference call service providers; and
   c. an audio control manager for selecting one of said service providers using said conference call service provider data base and said requests from said users.

2. The audio conference resource broker as recited in claim 1, wherein said request processor is implemented as a multi-threaded process on a server machine.

3. In a communications network having a plurality of conference call service providers and users connectible to each other, an audio conference resource broker independent of said service providers for selecting one of said conference call service providers to be used for establishing an audio conference call among a plurality of requesting ones of said users, said audio conference resource broker comprising:
   a. means for receiving user-generated requests from said requesting users to participate in an audio conference call, said requests comprising user preference information;
   b. means for maintaining a conference call service provider profile data base on each of said conference call service providers; and
   c. means for selecting one of said service providers using said conference call service provider profile database and said requests from said users.

4. The audio conference resource broker as recited in claim 3, wherein said means for receiving requests is implemented as a multi-threaded process on a server machine.

5. In a communications network having a plurality of conference call service providers and users connectible to each other, an audio conference resource broker independent of said service providers for automatically establishing an audio conference call among a plurality of requesting ones of said users, said audio conference resource broker comprising:
   a. means for receiving user-generated requests from said requesting users to participate in an audio conference call, said requests comprising user preference information;
   b. means for maintaining a conference call service provider profile data base on each of said conference call service providers; and
   c. means for selecting one of said service providers using said conference call service provider profile database and said requests from said users; and
   d. means for establishing an audio conference call by transmitting control signals to said selected one of said service providers which establishes said audio conference call in accordance with said requests from said users.

6. An apparatus as recited in claim 5, wherein said conference call service provider profile database comprises information on names, locations, availability and conference calling prices of said conference call service provider.

7. An apparatus as recited in claim 5, further comprising means for maintaining a user profile database on each of said users, wherein said user profile database is used to select one of said conference call service providers.

8. An apparatus as recited in claim 5, wherein said user provider database comprises information on names, access and accounting of users.

9. The audio conference resource broker as recited in claim 5, wherein said means for receiving requests is implemented as a multi-threaded process on a server machine.

10. In a communications network having a plurality of conference call service providers and users connectible to each other, a method of automatically establishing an audio conference call among a plurality of requesting ones of said users, said method comprising:
    a. receiving user-generated requests from said requesting users to participate in an audio conference call, said requests comprising user preference information;
    b. maintaining a conference call service provider profile data base on each of said conference call service providers; and
    c. selecting one of said service providers using said conference call service provider profile database and said requests from said users; and
    d. establishing an audio conference call by connecting said requesting users to said selected one of said service providers in accordance with said requests from said users.

11. An method as recited in claim 10, wherein said conference call service provider profile database comprises information on names, locations, availability and conference calling prices of said conference call service provider.

12. An method as recited in claim 10, further comprising means for maintaining a user profile database on each of said users, wherein said user profile database is used to select one of said conference call service providers.

13. An method as recited in claim 12, wherein said user provider database comprises information on names, access and accounting of users.

14. The method as recited in claim 10, wherein said step of receiving requests comprises receiving requests at a multi-threaded process on a server machine.

15. In a communications network having a plurality of conference call service providers and users connectible to each other, an audio conference resource broker independent of said service providers for automatically establishing an audio conference call among a plurality of requesting ones of said users, said audio conference resource broker comprising:
    a. a request processor for receiving user-generated requests from said requesting users to participate in an audio conference call, said requests comprising user preference information;

b. a service provider database for storing profile data base on each of said conference call service providers;

c. an optimizer for selecting one of said service providers using said profile data on each of said conference call service providers and using said requests from said users; and d. an audio control manager for transmitting control signals to said selected one of said service providers which establishes said audio conference call in response to said control signals.

16. An apparatus as recited in claim 15, wherein said request processor is implemented as a multi-threaded process on a server machine.

17. An apparatus as recited in claim 15, wherein said audio control manager maintains connection configuration information for each of said conference service providers.

18. An apparatus as recited in claim 17, wherein said connection configuration information comprises IP addresses of each of said service providers, and information on the audio bridging platform used by each of said service providers.

* * * * *